United States Patent [19]
Ikonen et al.

[11] Patent Number: 6,107,743
[45] Date of Patent: Aug. 22, 2000

[54] METHOD AND APPARATUS FOR CORRECTING IMAGE ERRORS CAUSED BY RESIDUAL MAGNETISM IN A PICTURE TUBE

[75] Inventors: Raimo Johannes Ikonen, Salo; Reijo Einari Pitkänen, Somero; Ilkka Juhani Saarinen, Salo, all of Finland

[73] Assignee: Nokia Display Products Oy, Salo, Finland

[21] Appl. No.: 09/196,729

[22] Filed: Nov. 20, 1998

[30] Foreign Application Priority Data

Nov. 28, 1997 [FI] Finland .................................... 974360

[51] Int. Cl.⁷ .................................................. H01J 29/06
[52] U.S. Cl. ................................................ 315/8; 313/413
[58] Field of Search ................................. 313/440, 413; 348/820; 315/8

[56] References Cited

U.S. PATENT DOCUMENTS

| | | | |
|---|---|---|---|
| 3,955,115 | 5/1976 | Manske | 315/8 |
| 4,331,903 | 5/1982 | Takenata et al. | 313/413 |
| 4,580,078 | 4/1986 | Spannhake | 315/8 |
| 5,021,712 | 6/1991 | Sands et al. | 315/8 |
| 5,023,510 | 6/1991 | Groothoff | 313/440 |
| 5,168,195 | 12/1992 | Breidigan et al. | 315/8 |
| 5,499,156 | 3/1996 | Bentley | 361/150 |
| 5,642,175 | 6/1997 | Hirakawa | 348/806 |
| 5,675,219 | 10/1997 | Helfrich | 315/8 |
| 5,696,565 | 12/1997 | Shintani et al. | 348/820 |
| 5,757,121 | 5/1998 | Nakata | 313/440 |
| 5,825,131 | 10/1998 | Kim | 315/8 |

FOREIGN PATENT DOCUMENTS

| | | |
|---|---|---|
| 0123612 | 10/1984 | European Pat. Off. . |
| 0362537 | 4/1990 | European Pat. Off. . |

*Primary Examiner*—Don Wong
*Assistant Examiner*—Chuc Tran D.

[57] ABSTRACT

The invention relates to a method and apparatus for correcting image errors caused by residual magnetism in monitors and other such display devices based on picture tubes. The method according to the invention is based on the removal of residual magnetism by means of an alternating damped magnetic field. In the method, the internal and external structures in the neck part (11) of a picture tube (10) are subjected to an alternating damped magnetic field produced by means of a coil (45).

21 Claims, 7 Drawing Sheets

METHOD AND APPARATUS FOR CORRECTING IMAGE ERRORS CAUSED BY RESIDUAL MAGNETISM IN A PICTURE TUBE

BACKGROUND OF THE INVENTION

1. Technical Field

The invention relates to a method for correcting image errors caused by residual magnetism in monitors and other similar display devices based on picture tubes. The invention also relates to an apparatus for correcting image errors caused by residual magnetism in a picture tube.

2. Discussion of Related Art

Picture tubes are apparatus based on cathode ray tubes the purpose of which is to convert picture information in an electrical form into a visible picture. FIG. 1 shows the structure and operating principle of a typical picture tube 10 used in color monitors. The picture tube 10 comprises a neck part 11 and a funnel 12. In addition, the picture tube entity is considered to comprise other components closely related to its operation, such as an electron gun part 13 located inside the picture tube's neck part 11, external components placed on the neck part 11, such as a deflection yoke 20, a convergence coil unit 21 containing the convergence coils, a tilt coil 22, an LMF coil 23, a ring magnet 24, and an R/B convergence coil 27 used in some picture tube models. Additionally, components are found inside the funnel 12, such as magnetic shielding 17, a mask 26, and a screen 25.

Operation of the color picture tube is based on three separate electron beams 14, 15, 16 produced by the electron gun part 13 located inside the neck part. The electron beams 14, 15, 16 travel through a magnetic field produced inside the picture tube by the deflection yoke 20 so that a force is exerted on the electron beams 14, 15, 16 which affects their trajectories. By means of the magnetic field produced by the deflection yoke 20 the electron beams 14, 15, 16 are directed to a desired position on the screen 25. As the electron beams 14, 15, 16 hit the fluorescent surface of the screen 25 they generate a spot of light. By deflecting the electron beams 14, 15, 16 in a rapid pace to various locations on the screen a set of pixels is produced which the eye perceives as a continuous illuminated area.

A mask 26 is placed in front of the screen 25. The mask 26 is made of a thin metal plate having apertures in it. Depending on the type of the picture tube the apertures may be e.g. round holes (so-called shadow mask), narrow slits extending from the bottom of the picture tube to the top (so-called trinitron mask) as in FIG. 2, or elongated in the vertical direction (so-called slot mask).

In a correctly adjusted picture tube the trajectories of all three electron beams 14, 15, 16 intersect at the mask 26 so that they all hit the same aperture 26a in the mask 26, as shown in FIG. 2. Since the beams 14, 15, 16 arrive from slightly different directions, they spread out after the mask 26 to hit their designated phosphor stripes 29a, 29b, 29c. As the beams 14, 15, 16 hit the phosphor stripes 29a, 29b, 29c light is generated the color of which depends on the phosphor used. According to the RGB standard the phosphors are typically chosen such that one produces red (R), the second green (G) and the third blue (B). Since the three spots of light thus generated are close to each other, the eye does not perceive them as separate dots but the visual perception is produced as the sum of all three colors. By varying the relative brightness of the different colors one can produce almost an arbitrary number of different hues.

The information above applies to the operation of a color picture tube in an ideal situation wherein the paths of the electron beams are fully controllable. In practice there may occur inside the picture tube unwanted magnetic fields, too, which cause unwanted deflections in the trajectories of the electron beams 14, 15, 16. This may lead to a point where the electron beams 14, 15, 16 are no longer targeted at the same exact location on the mask 26. If the separations are large compared to the distances between the apertures in the mask 26, the electron beams 14, 15, 16 controlling different color components are directed to different mask apertures instead of the same one, which on the screen causes detachment of the colors from each other. At close inspection the detachment of the colors can be seen in the image, and when viewed from a distance the image appears unsharp.

In monitors and other similar display devices based on picture tubes, image sharpness is one of the most important factors affecting the pleasantness of use of the apparatus. Therefore, attempts have been made to minimize the detachment of colors.

Unwanted magnetic fields are typically caused by residual magnetism in magnetic substances, such as iron, in the picture tube and in its immediate vicinity. Residual magnetism means magnetism that is created in a magnetic substance in a varying magnetic field and which remains after the magnetic field, which caused the magnetization, has been removed.

The picture tube and monitors have several components made of a magnetic material, such as the mask 26 in the picture tube and protective covers made of iron in monitors.

Problems caused by residual magnetism can be eliminated by demagnetizing the magnetized parts, i.e. by removing the magnetism in them.

It is known to direct a strong alternating damped magnetic field to the funnel 12 of the picture tube in order to demagnetize the magnetic shielding 17 and the mask 26. Known prior-art methods apply arrangements in which demagnetization is realized by means of a demagnetizing coil 30 placed in the funnel 12 of the picture tube as shown in FIG. 3. In FIG. 3 the picture tube 10 is viewed from the neck part 11 side, not showing the external structures of the picture tube's neck part.

By means of an alternating damped magnetic field produced by a demagnetizing coil 30 placed in the funnel 12 it has been possible to demagnetize the magnetized components in the funnel 12 of the picture tube.

In addition to a demagnetizing coil 30 placed in the funnel 12 it is known to manufacture a hand-held demagnetizing coil with which it has been possible to demagnetize metal parts in the monitor which, because of their location, remain outside the magnetic field produced by a demagnetizing coil 30 placed in the funnel 12 of the picture tube. As the method based on a hand-held demagnetizing coil requires the purchase of a separate demagnetizing apparatus, the method is used primarily by commercial enterprises assembling and servicing monitors. The application of the method to repeated demagnetization of a monitor in normal use is difficult since in the method the demagnetizing apparatus has to be brought near the components to be demagnetized, which in practice requires that the cover of the monitor be removed.

With the prior-art demagnetizing arrangements based on a demagnetizing coil 30 placed in the funnel 12 of the picture tube it has been possible to eliminate a great part of the image errors caused by residual magnetism. Some of the image errors, however, remain in spite of demagnetization.

SUMMARY OF INVENTION

An object of this invention is to provide a new method and apparatus for correcting image errors produced by residual magnetism in a picture tube. Compared to the prior art the solution according to the invention is substantially better at eliminating image errors caused by residual magnetism. The invention is based on realizing the demagnetization by means of coils placed on the neck part of the picture tube.

According to a first aspect of the present invention, a method for correcting image errors caused by residual magnetism in a picture tube by means of demagnetization based on the use of an alternating damped magnetic field, is characterized in that the demagnetization is directed to a neck part of the picture tube and/or to internal and/or external structures of the neck part of the picture tube.

According to a second aspect of the invention, an apparatus for demagnetizing a picture tube comprising means for providing a current for producing an alternating damped magnetic field, and means responsive to the current for producing the alternating damped magnetic field is characterized in that at least part of the means for producing the alternating damped magnetic field is for placement in a fixed manner in or on a neck part of the picture tube or in its immediate vicinity.

In further accord with either the first or second aspects of the invention, the alternating damped magnetic field may be produced by means of coils in the neck part of the picture tube, or by means of converging coils in the picture tube, or by means of a tilt coil in the picture tube, or by means of a deflection coil in the picture tube. The variation in the magnetic field produced by the coils can be controlled by means of a program stored in a memory of a signal processor. A current oscillation producing the alternating damped magnetic field may be generated by means of an oscillatory circuit comprising a capacitance, coil, and resistor interconnected to form the oscillatory circuit. The capacitance may be produced by means of an internal capacitance of a voltage source, while an attenuation producing the alternating damped magnetic field may be produced by means of a variable resistor connected to form the circuit. A waveform of the alternating damped magnetic field may be adapted to correspond to a waveform of a voltage source. An alternating current for producing the alternating damped magnetic field may be generated by means of an amplifier circuit controlled by a separate oscillator. Damping of the current may be caused by a drop in operating voltage of the amplifier. The operating voltage of the amplifier may be moderated by means of capacitances connected to a circuit. The capacitances may be produced by means of internal capacitances of the voltage source.

Compared to the prior art the advantage of the method and apparatus according to the invention is an improved image sharpness as the image errors caused by residual magnetism are reduced. With the method according to the invention, demagnetization removing the residual magnetism can be realized without additional components.

BRIEF DESCRIPTION OF THE DRAWINGS

The invention will now be described in more detail with reference to the accompanying drawing wherein.

DETAILED DESCRIPTION OF PREFERRED EMBODIMENTS

Figure 1:
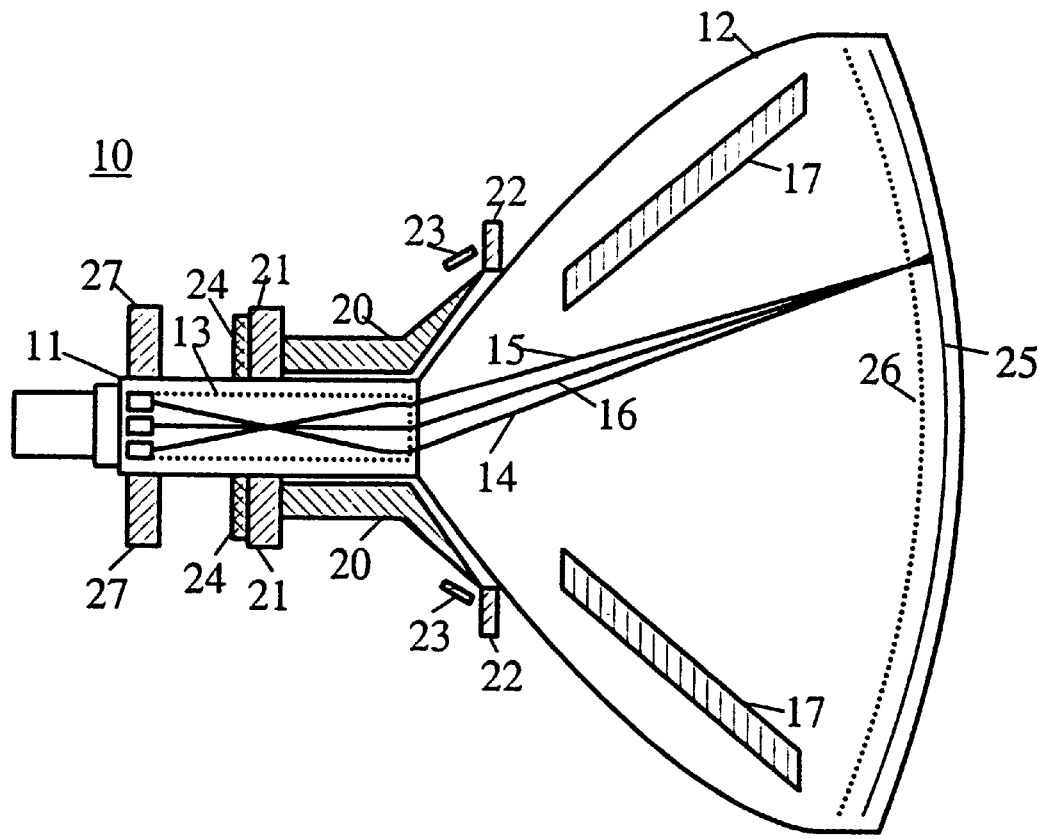
FIG. 1 shows the structure and operation of a picture tube.
Figure 2:
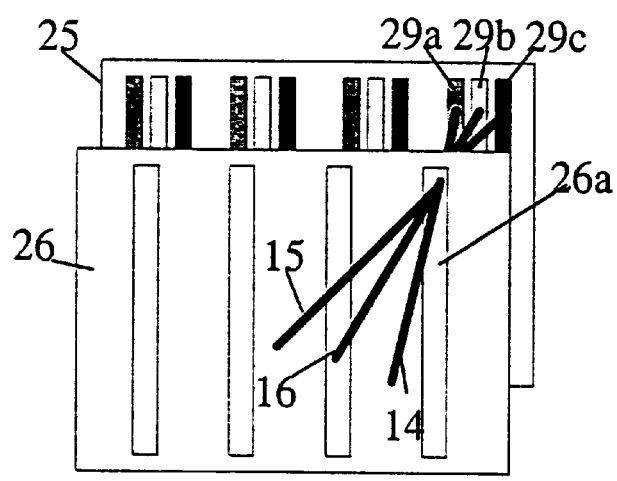
FIG. 2 shows the structure of a trinitron-type mask and screen.
Figure 3:
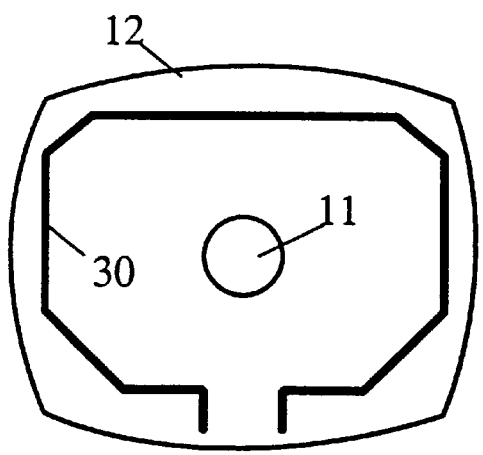
FIG. 3 shows a prior-art demagnetizing coil in the funnel of a picture tube.

FIGS. 1, 2 and 3 were discussed above in conjunction with the description of the prior art.

In the method according to the invention residual magnetism is removed from the neck part 11 of a picture tube and from external and internal structures and components in the neck part 11 by subjecting the neck part 11 to an alternating damped magnetic field. The magnetic field can be advantageously generated by means of coils placed on the neck part 11 of the picture tube as shown in FIG. 1, such as a tilt coil 22, convergence coils in the convergence unit 21, or deflection coils controlling the horizontal and vertical deflection in the deflection yoke 20.

Figure 4:
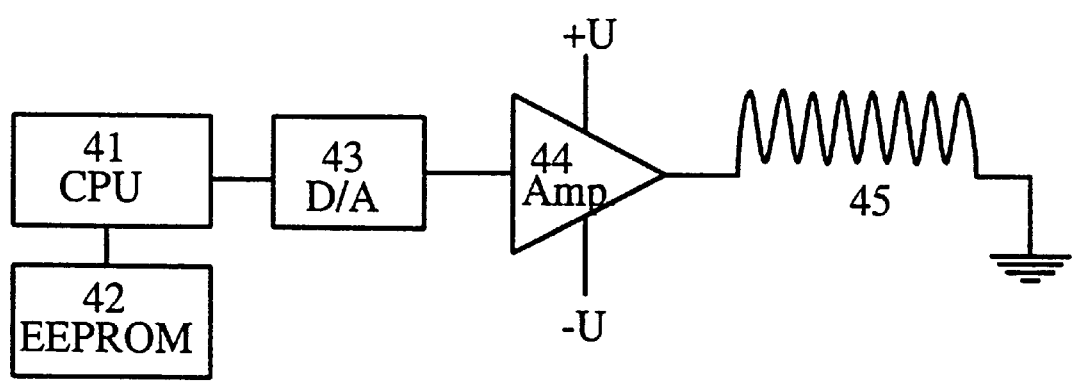
FIG. 4 shows a schematic of the control circuit of a coil producing a magnetic field.

Referring to FIG. 4, let us consider as an example of the demagnetization according to the invention the use of convergence coils in the convergence unit 21 in the demagnetization of the picture tube neck 11. Demagnetization by means of tilt coils 22 and vertical deflection coils in the deflection yoke 20 can be realized with similar arrangements as those described in the example.

FIG. 4 shows a schematic of the convergence coil 45 control circuit 40 in a convergence coil unit 21. The control circuit 40 comprises a microprocessor 41 which by means of a program stored in the memory 42 controls via a D/A converter 43 the current supplied to the convergence coil 45 by an amplifier 44.

In normal operation the microprocessor 41 controls the value of the current supplied to the convergence coil 45 according to calibration data stored in the memory 42 in such a manner that the different electron beams 14, 15, 16 intersect at the mask 26 plane regardless of which area of the screen 25 is being illuminated.

It is, however, not possible to include in the calibration data the effects of magnetic fields caused by residual magnetism as they are dependent on the varying magnetic fields directed to the picture tube. Residual magnetism may be caused e.g. when the monitor is moved within an external magnetic field or if the user makes changes, even temporary ones, in the convergence settings. So it is obvious that varying magnetic fields directed to the picture tube cannot be anticipated with accuracy. Therefore, the program responsible for the regulation of the convergence coils cannot correct image errors caused by residual magnetism. In the solution according to the invention, a program controlling demagnetization is added to the memory 42, to be run e.g. always at power-on and/or when the user so chooses.

Figure 5:
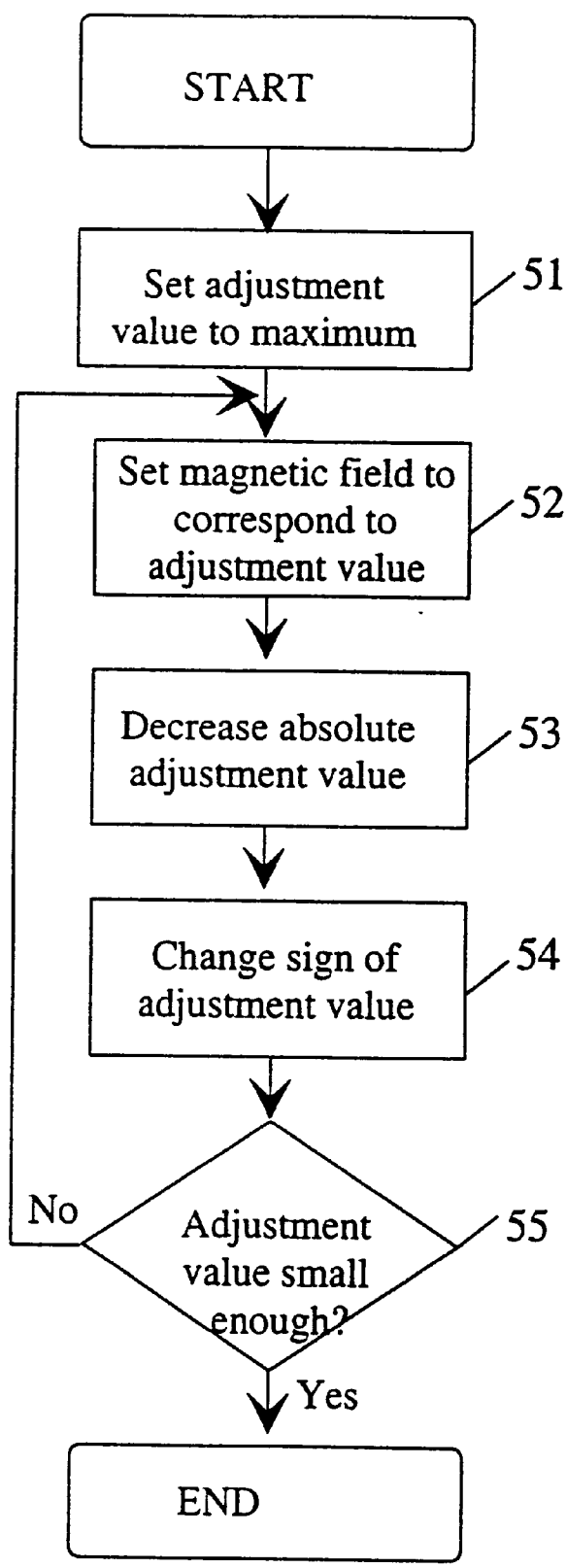
FIG. 5 shows a flow diagram of a demagnetizing program according to the invention.

FIG. 5 shows a flow diagram 50 of a demagnetizing program controlling a circuit 40 according to FIG. 4. In the first step 51 the adjustment value is set to maximum ($H_{max}$). In step 52 the current flowing through the coil 45 is changed such that the strength of the magnetic field produced corresponds to the chosen adjustment value ($H_{max}$). Then the absolute adjustment value is decreased (say, 0.9 $H_{max}$) in step 53, and in step 54 the sign of the adjustment value is changed (say, −0.9 $H_{max}$).

In step 55 it is checked whether the absolute adjustment value is smaller than a predetermined end value (say, 0.001 $H_{max}$). If not, the program returns to step 52 in which the current through the coil 45 is changed such that the strength of the magnetic field produced corresponds to the new adjustment value (−0.9 $H_{max}$). The loop of steps 52 to 55 is repeated until the absolute value of the magnetic field is zero or sufficiently close to zero from the demagnetization standpoint, which is detected in step 52 when the absolute adjustment value goes below a predetermined end value (say, 0.001 $H_{max}$). Then the demagnetization according to the invention is complete and the program ends.

Figure 6A:
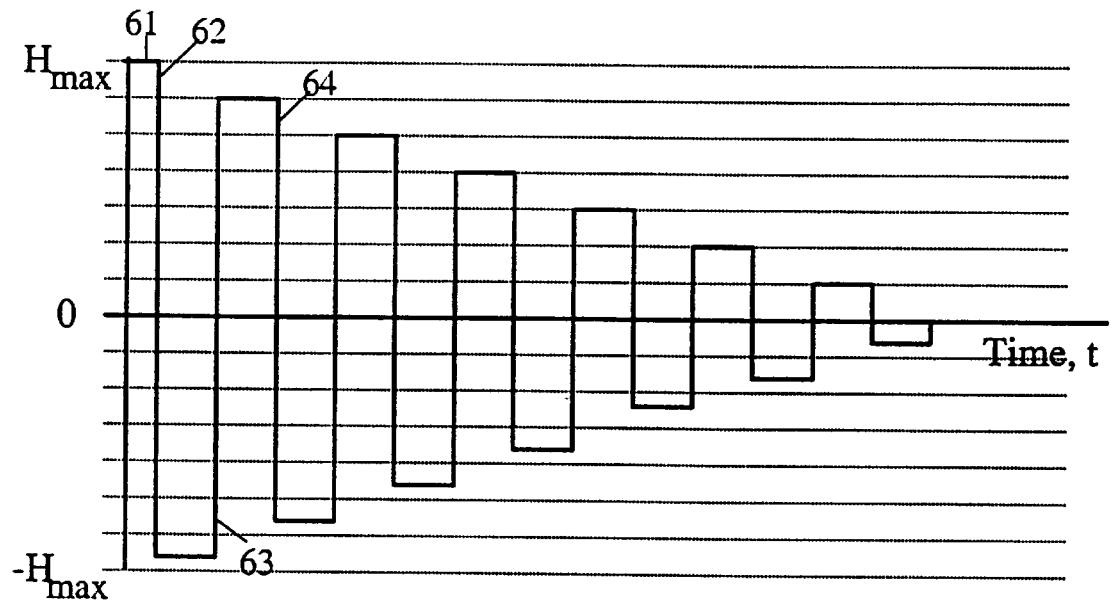
FIGS. 6a and 6b show the behavior of alternating damped magnetic fields according to the invention.

FIG. 6a illustrates the temporal behavior of the strength of the magnetic field according to the invention implemented in the manner described above. In step 61 the magnetic field value H is at the maximum ($H_{max}$), corresponding to the first cycle through the loop 52 to 55 in block diagram 50. Step 62 corresponds to step 52 in block diagram 50 during the second cycle through the loop 52 to 55 wherein the magnetic field value H is changed such that it corresponds to the adjustment value changed in steps 53 and 54 in the previous cycle of the loop 52 to 55. Similarly, steps 63 and 64 correspond to step 52 of block diagram 50 during the third and fourth cycles through the loop 52 to 55.

Figure 6B:
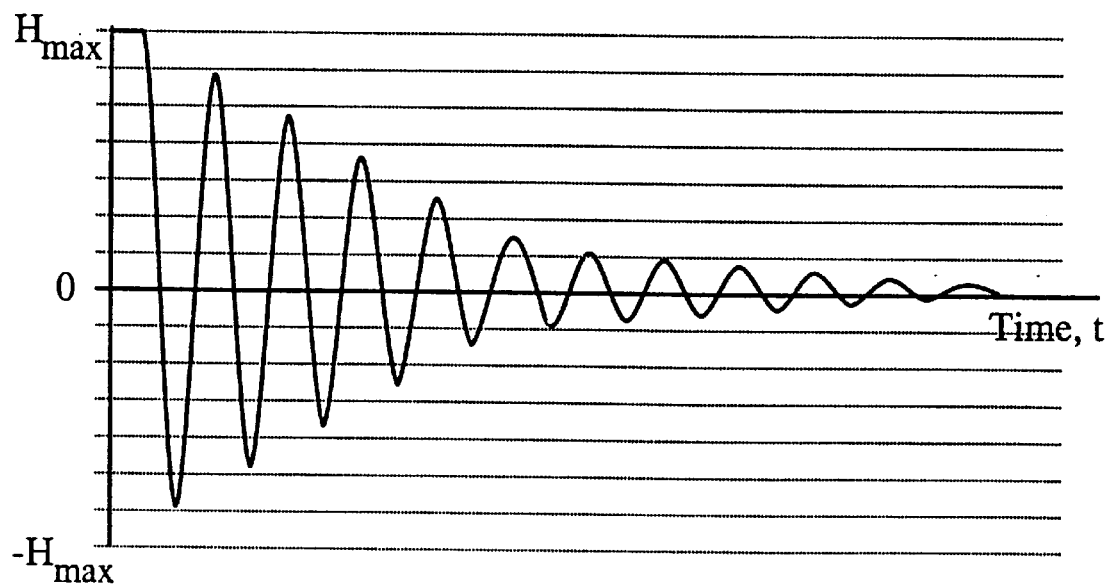

The invention does not limit the waveform or damping ratio used. Instead of the square wave shown in FIG. 6a the waveform of the magnetic field variation may be e.g. a sawtooth or sine wave, as in FIG. 6b. The damping ratio may be linear as above ($H_{max}$, −0.9 $H_{max}$, 0.8 $H_{max}$, ...) or e.g. geometrical so that the absolute value of the magnetic field of cycle n is obtained from the absolute value of the previous cycle n−1 using the formula $H(n)=-xH(n-1)$. Should x be e.g. 0.9, the magnetic field strength H would be damped according to the geometrical progression ($H_{max}$, −0.9 $H_{max}$, 0.81 $H_{max}$, −0.729 $H_{max}$, ...).

Figure 7:
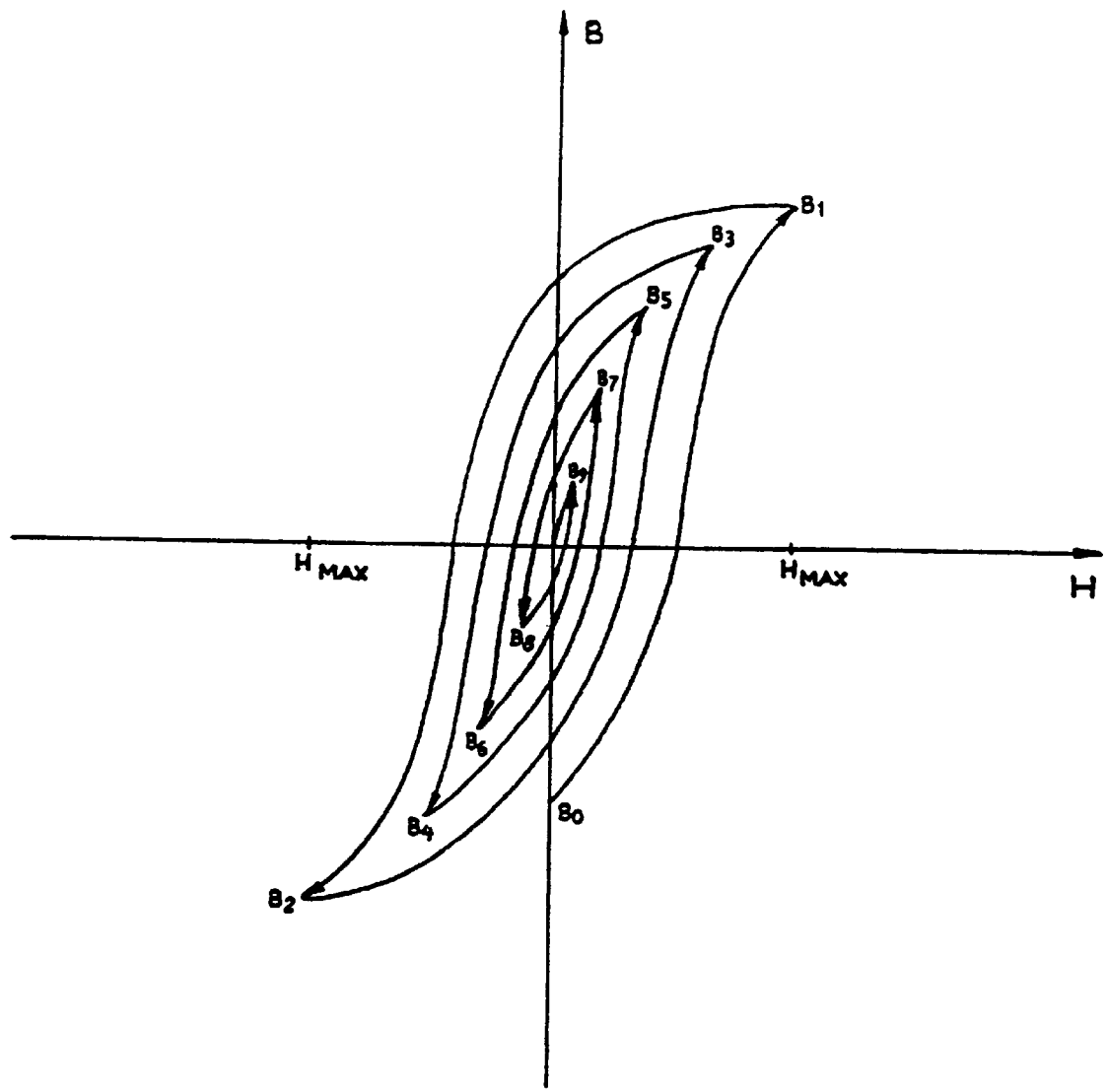
FIG. 7 shows by means of a hysteresis loop the effect of the alternating damped magnetic field according to the invention on the residual magnetism in the neck of a picture tube.

FIG. 7 shows by means of a hysteresis curve the effect of an alternating damped magnetic field on a magnetized material subjected to the magnetic field. Because of residual magnetism, the magnetic flux density B will not go to zero even if the external magnetic field were zero (point $B_0$). At the start of demagnetization the magnetic field is first set to the maximum value. Then the magnetic flux density increases according to the hysteresis curve shown in FIG. 7 from point $B_0$ to point $B_1$. As the magnetic field is reversed, the magnetic flux density (B) decreases according to the hysteresis curve shown from point $B_1$ to point $B_2$. As the magnetic field alternates and at the same time its absolute value decreases the magnetic flux density of the magnetized material changes according to the hysteresis curve shown, going through points $B_3$ to $B_9$.

The hysteresis curve in FIG. 7 shows clearly how the material's residual magnetism, which in the drawing is represented by the distance of the curve from the origin when the external magnetic field (H) is zero, decreases in each magnetic field cycle.

Figure 8:
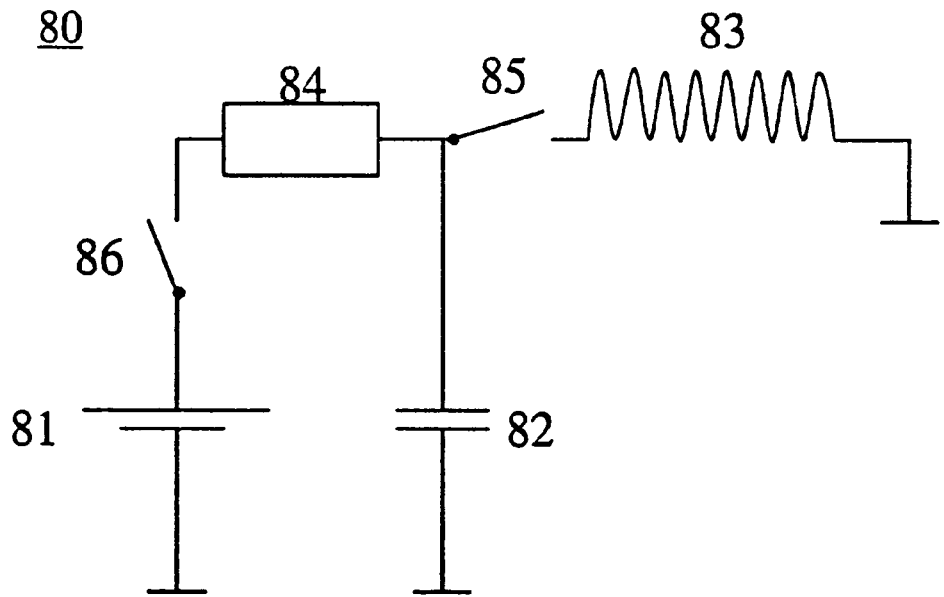
FIG. 8 shows an oscillating circuit produced by the alternating damped magnetic field according to the invention.

FIG. 8 shows an oscillatory circuit 80 which can be used to produce the alternating damped magnetic field according to the invention without the control circuit 40 based on a processor 41, shown in FIG. 4. The oscillatory circuit 80 comprises a DC supply 81, capacitance 82, coil 83 and a resistor 84. The capacitance 82 may be e.g. internal capacitance in the voltage supply of the picture tube or a capacitor added to the circuit 80 especially for this purpose.

When the voltage source 81 is connected to the circuit 80, electrical charge accumulates in the capacitance 82. Initially, switch 86 is closed and switch 85 open. When the voltage source 81 is disconnected from the circuit 80 by opening switch 86 and closing switch 85, the energy accumulated in the capacitance 82 starts to discharge through the coil 83. Then the current flowing in the circuit 80 starts to oscillate in the manner determined by the characteristics of the resistor 84, capacitance 82 and coil 83, producing by means of the coil 83 a magnetic field corresponding to the current waveform. By selecting the components in the circuit 80 in a known manner it is possible to produce an alternating damped magnetic field similar to the one shown in FIG. 6b.

Figure 9:
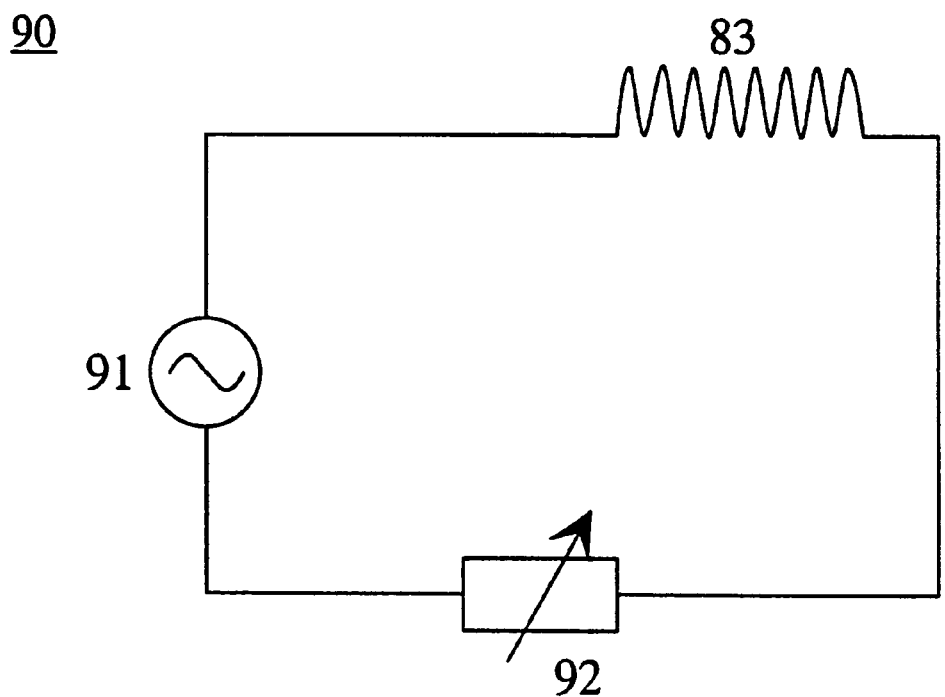
FIG. 9 shows a second oscillating circuit produced by the alternating damped magnetic field according to the invention.

FIG. 9 shows another arrangement for producing the alternating damped magnetic field according to the invention. The alternating current flowing in the electrical circuit 90 shown in FIG. 9 is generated by means of an AC supply 91. The supply 91 may be e.g. an operating voltage direct from the mains. The alternating current generated by the supply 91 produces in coil 83 an alternating magnetic field corresponding to the waveform of the supply. When the resistance of the variable resistor 92 is changed, in particular increased, e.g. by the warming-up caused by the current flowing through it, the amplitude of the alternating current in the circuit decreases, and this in turn correspondingly decreases the amplitude of the alternating magnetic field generated in the coil 83, thus producing the alternating damped magnetic field according to the invention.

Figure 10A:
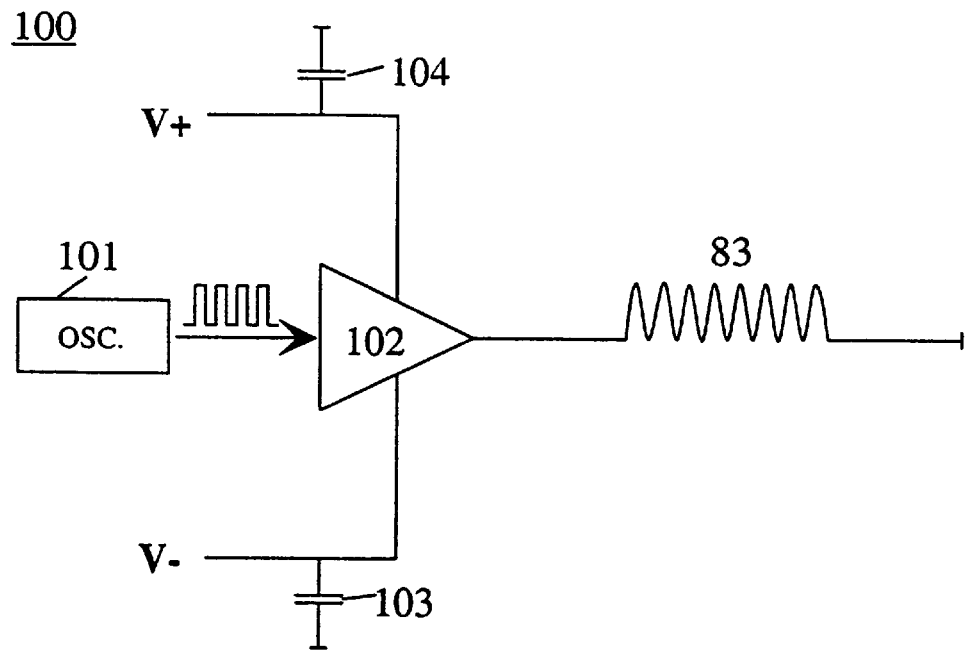
FIGS. 10a and 10b show a solution based on an amplifier circuit to produce the alternating damped magnetic field according to the invention.

FIG. 10a shows an electrical circuit 100 to produce the alternating damped magnetic field according to the invention by means of an amplifier 102 controlled by an oscillator 101. When the operating voltages (V+, V−) are connected to the amplifier 102, the waveform of the current flowing from the output of the amplifier 102 to the coil 83 and, hence, the waveform of the magnetic field generated in the coil 83, correspond to the waveform, a square wave, for example, supplied by the oscillator 101 to the amplifier 102.

Figure 10B:
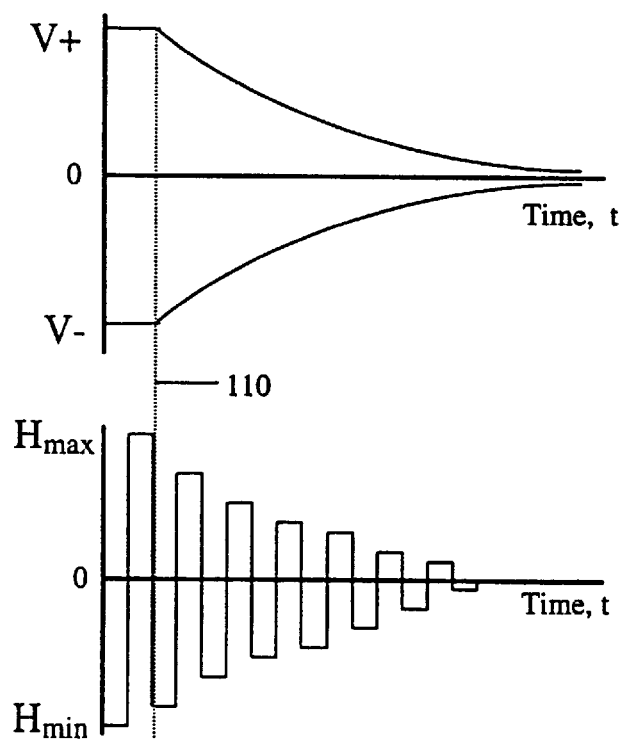

FIG. 10b illustrates how the operating voltage to circuit 100 and the magnetic field generated behave when the operating voltages are cut off. The upper diagram shows the behavior of the operating voltage to the amplifier 102 and the lower diagram shows the behavior of the magnetic field produced by coil 83 at the moment of shutoff. At moment 110 the operating voltages are cut off and the charges accumulated in capacitors 103 and 104 start to discharge. As the charges in capacitors 103 and 104 decrease, the operating voltages of the amplifier 102 drop according to the upper diagram in FIG. 10b. Then also the amplitudes of the current supplied by the amplifier 102 to the coil 83 decrease, causing the amplitudes of the alternating magnetic field produced by the coil 83 to attenuate in accordance with the lower diagram in FIG. 10b, thus producing the alternating damped magnetic field according to the invention. Capacitances 103 and 104 may be e.g. internal capacitance in the voltage source of the picture tube or capacitors added to the circuit 100 particularly for this purpose.

In practice the arrangement described above can be realized e.g. in such a manner that in conjunction with power-down the drop in the operating voltages of vertical deflection coils in the deflection yoke generates the alternating damped magnetic field needed for the demagnetization according to the invention.

The method according to the invention does not limit the coils used in the demagnetization. In principle, all coils in the vicinity of the picture tube's neck part can be used for realizing the demagnetization according to the invention. If required, coil control may be implemented using a separate oscillator circuit which advantageously would use the mains waveform to generate the alternating magnetic field.

If desired, the demagnetization according to the method can be realized using a separate apparatus placed near the neck part 11 of the picture tube comprising means for producing an alternating damped magnetic field. Said means may be e.g. a coil and an oscillator.

The method according to the invention does not have any significant disadvantages. Using the arrangement according to FIG. 4 the method can be realized without additional components, and the program controlling the demagnetization uses only a little amount of memory 42.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A method for correcting image errors caused by residual magnetism in a picture tube by means of demagnetization based on the use of an alternating damped magnetic field characterized in that the demagnetization is directed to a neck part (11) of the picture tube (10) and to either internal structures or external structures or to both internal structures and external structures of the neck part (11) of the picture tube (10) comprising the steps of:

producing said alternating damped magnetic field in accordance with a demagnetization control program for controlling current flowing through said either internal or external structures;

sensing the magnitude of said alternating damped magnetic field;

adjusting in response to said sensed magnitude of said magnetic field the magnitude of said current flowing through said either internal or external structures;

comparing the magnitude of said sensed magnetic field to a predetermined end magnitude of said magnetic field, and repeating the steps of sensing, adjusting and comparing until said sensed magnetic field magnitude is equal to or less than said predetermined end magnitude of said magnetic field.

2. The method of claim 1, characterized in that said alternating damped magnetic field is produced by means of coils in the neck part (11) of the picture tube (10).

3. The method of claim 1, characterized in that said alternating damped magnetic field is produced by means of convergence coils in the picture tube (10).

4. The method of claim 1, characterized in that said alternating damped magnetic field is produced by means of a tilt coil in the picture tube (10).

5. The method of claim 1, characterized in that said alternating damped magnetic field is produced by means of a deflection coil (20) in the picture tube (10).

6. The method of claim 1, characterized in that a variation in the magnetic field is controlled by means of a program stored in a memory (42) of a signal processor (41).

7. The method of claim 1, characterized in that current oscillation for producing said alternating damped magnetic field is generated by means of an oscillatory circuit comprising a capacitance (82), coil (83) and resistor (84) interconnected to form the oscillatory circuit.

8. The method of claim 7, characterized in that said capacitance (82) is produced by means of an internal capacitance of a voltage source (81).

9. The method of claim 1, characterized in that an attenuation producing said alternating damped magnetic field is produced by means of a variable resistor (92) connected to form the circuit.

10. The method of claim 1, characterized in that a waveform of said alternating damped magnetic field is adapted to correspond to a waveform of a voltage source (91).

11. The method of claim 1, characterized in that an alternating current for producing said alternating damped magnetic field is generated by means of an amplifier circuit (102) controlled by a separate oscillator (101).

12. The method of claim 11, characterized in that damping of said current is caused by a drop in operating voltage of the amplifier (102).

13. The method of claim 12, characterized in that said drop in the operating voltage is moderated by means of capacitances (103, 104) connected to a circuit (100).

14. The method of claim 13, characterized in that said capacitances (103, 104) are produced by means of internal capacitances of a voltage source.

15. An apparatus for demagnetizing a picture tube comprising memory means for storing a demagnetization control program to provide a current magnitude value corresponding to a magnetic field value, means responsive to a current magnitude value retrieved from said memory means in accordance with said demagnetization control program for providing a current for producing an alternating damped magnetic field, and means responsive to said current for producing said alternating damped magnetic field, characterized in that at least part of said means for producing said alternating damped magnetic field is for placement in a fixed manner in or on a neck part of the picture tube or in its immediate vicinity.

16. The apparatus of claim 15 characterized in that said alternating damped magnetic field is produced by means of coils in the neck part (11) of the picture tube (10).

17. The apparatus of claim 15, characterized in that said alternating damped magnetic field is produced by means of convergence coils in the picture tube (10).

18. The apparatus of claim 15, characterized in that said alternating damped magnetic field is produced by means of a tilt coil in the picture tube (10).

19. The apparatus of claim 15, characterized in that said alternating damped magnetic field is produced by means of a deflection coil (20) in the picture tube (10).

20. A method for correcting image errors caused by residual magnetism in a picture tube by means of demagnetization comprising the steps of producing an alternating damped magnetic field having a magnitude in accordance with a demagnetization control program characterized in that the demagnetization is directed to a neck part (11) of the picture tube (10) and to either internal structures or external structures or to both internal structures and external structures of the neck part (11) of the picture tube (10) and further characterized by producing said alternating damped magnetic field by means of convergence coils in the picture tube (10).

21. An apparatus for demagnetizing a picture tube comprising means for providing a current for producing an alternating damped magnetic field, and means responsive to said current for producing said alternating damped magnetic field, characterized in that at least part of said means for producing said alternating damped magnetic field is for placement in a fixed manner in or on a neck part of the picture tube or in its immediate vicinity characterized in that said alternating damped magnetic field is produced by means of convergence coils in the picture tube (10).

* * * * *